United States Patent
Rothon et al.

(10) Patent No.: US 7,732,514 B2
(45) Date of Patent: Jun. 8, 2010

(54) FILLER COMPOSITES

(75) Inventors: Roger Norman Rothon, Cheshire (GB); Dean Thetford, Manchester (GB); Stuart Nicholas Richards, Manchester (GB); John David Schofield, Manchester (GB)

(73) Assignee: The Lubrizol Corporation, Wickliffe, OH (US)

( * ) Notice: Subject to any disclaimer, the term of this patent is extended or adjusted under 35 U.S.C. 154(b) by 1434 days.

(21) Appl. No.: 10/508,237

(22) PCT Filed: Feb. 19, 2003

(86) PCT No.: PCT/GB03/00718

§ 371 (c)(1),
(2), (4) Date: Sep. 20, 2004

(87) PCT Pub. No.: WO03/080720

PCT Pub. Date: Oct. 2, 2003

(65) Prior Publication Data

US 2005/0165144 A1 Jul. 28, 2005

(30) Foreign Application Priority Data

Mar. 22, 2002 (GB) ................... 0206755.1
Nov. 16, 2002 (GB) ................... 0226925.6

(51) Int. Cl.
*C08K 5/3415* (2006.01)
*C08K 5/09* (2006.01)
*C08K 3/00* (2006.01)

(52) U.S. Cl. ................ 524/104; 524/321; 524/425; 524/436; 524/437; 428/403

(58) Field of Classification Search ........... 524/104, 524/321, 437; 428/403
See application file for complete search history.

(56) References Cited

U.S. PATENT DOCUMENTS

| | | | | |
|---|---|---|---|---|
| 4,108,947 A | * | 8/1978 | Kimura et al. | 525/97 |
| 4,320,173 A | * | 3/1982 | Coran et al. | 428/457 |
| 4,687,810 A | * | 8/1987 | Coran | 525/74 |
| 2005/0288457 A1 | * | 12/2005 | Liu et al. | 525/529 |

FOREIGN PATENT DOCUMENTS

| | | | |
|---|---|---|---|
| DE | 258242 A1 | * | 7/1988 |
| GB | 1223286 | | 2/1971 |
| JP | 11-124467 | | 5/1999 |

OTHER PUBLICATIONS

Derwent 1988-323938 abstract for DD 258242 A1, Jul. 13, 1988.*
Corresponding International Publication No. WO 03/080720 A1 and Search Report; International Publication Date: Oct. 2, 2003.
Tabtiang, Arunee et al., "The Performance of Selected Unsaturated Coatings for Calcium Carbonate Filler in Polypropylene", European Polymer Journal, vol. 36, 2000, pp. 137-148.

* cited by examiner

*Primary Examiner*—Vickey Nerangis
(74) *Attorney, Agent, or Firm*—Samuel B. Laferty; Thoburn T. Dunlap

(57) ABSTRACT

A composition comprising a plastics material, an inorganic particulate solid such as aluminium trihydrate and a coupling modified of formula

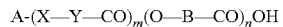

$$A\text{-}(X\text{—}Y\text{—}CO)_m(O\text{—}B\text{—}CO)_n OH$$

wherein A is a moiety containing a terminating ethylenic group with one or two adjacent carbonyl groups; X is a direct bond, O or N; Y is $C_{1-18}$-alkylene or $C_{2-18}$-alkenylene; B is $C_{2-6}$-alkylene; m is from 1 to 4 and n is from 0 to 5 provided that when A contains two carbonyl groups adjacent to the ethylenic group then X is N. Specific examples of coupling modifiers are β-carboxyl ethylacrylate and 5-carboxy pentyl maleimide.

18 Claims, No Drawings

FILLER COMPOSITES

The present invention relates to a composition comprising a polymeric material or elastomer, an inorganic particulate solid and a coupling agent containing both a terminating carboxylic acid group and a terminating ethylenic unsaturated group.

The incorporation of inorganic fillers into polymeric materials such as thermoplastic polymers, thermosetting polymers, elastomers and rubbers has long been known. Whereas moulded articles made from such polymeric materials containing fillers generally exhibit improved stiffness, hardness and creep resistance, the articles also tend to exhibit a marked decrease in toughness and ductility. This is particularly the case with filled thermoplastic polymers where the moulded articles become too brittle, too low in impact resistance and elongation to be of any practical use.

Various approaches have been published to improve the compatibility of the inorganic particulate solid with the polymeric materials in an attempt to improve the above deficiencies. These involve incorporating a surface modifier for the particulate solid which may be coated on the particulate solid as a separate pre-treatment or added to the mixture of polymeric materials and particulate solid at a convenient stage during processing.

The surface modifiers generally fall into two distinct categories, namely coupling and non-coupling modifiers. In non-coupling surface modifiers the modifier interacts with the surface of the particulate solid but not with the polymer matrix. In coupling surface modifiers the modifier interacts strongly with both the surface of the particulate solid and the polymer matrix. Acid functional modifiers are represented in both these classes and include fatty acids and polymeric acids. Fatty acids are typically non-coupling modifiers where the carboxylic acid group binds strongly to the surface of the inorganic particulate solid and the fatty group intercolates with the polymer matrix. Polymeric acids are generally regarded as coupling surface modifiers where the carboxy group, interacts strongly with the surface of the inorganic particulate solid and the polymeric chain interacts strongly with the polymer matrix. The extent of this interaction depends largely on the functionality of the surface modifier and the type of polymeric material. Examples of polymeric acids which contain free olefinic groups are disclosed in U.S. Pat. No. 4,385,136, U.S. Pat. No. 3,519,593 and GB 1,223, 286. Simple carboxylic acids which contain an olefinic unsaturated bond have also been examined as coupling modifiers. Thus, acrylic acid itself has been disclosed as a coupling modifier for calcium carbonate fillers in polypropylene in European Polymer Journal 36, 2000, 137-148. However, its volatility during processing is a distinct disadvantage. JP 64-33163 has also disclosed surface treatment using succinic acid half esters of hydroxy $C_{2-6}$-alkyl acrylic acid. However, none of these acids which contain an olefinic bond have been found entirely satisfactory.

It has now been found that certain derivatives of maleimide and (meth)acrylic acid exhibit advantage as surface modifiers for inorganic particulate solids compared with those known to the art. Thus according to the invention there is provided a composition comprising a plastics material, an inorganic particulate solid and a coupling modifier of formula 1.

$$A\text{-}(X\text{—}Y\text{—}CO)_m(O\text{—}B\text{—}CO)_n OH \qquad 1$$

wherein

A is a moiety containing a terminating ethylenic group with one or two adjacent carbonyl groups;

X is a direct bond, O or N;

Y is $C_{1-18}$-alkylene or $C_{2-18}$-alkenylene;

B is $C_{2-6}$-alkylene;

m is from 1 to 4;

n is 0 to 5;

with the exception of acrylic acid, provided that when A contains two carbonyl groups adjacent to the ethylenic group, X is N.

When A contains a single carbonyl group and X is O then the group A-X— is preferably the residue of $C_{1-6}$-alkyl acrylic acid such as methacrylic acid and especially acrylic acid. When A contains two carbonyl groups adjacent to the ethylenic double bond and X is N the group A-X— is preferably the residue of maleimide.

Y may be linear or branched but is preferably linear. It is also preferred that Y is alkylene and that Y contains not less than 2 carbon atoms.

B may be substituted by one or more $C_{1-6}$-alkyl groups which may be linear or branched. The group $(O\text{—}B\text{—}CO)_n$ may be the residue of one or more different hydroxy carboxylic acids or lactones thereof. Preferably B contains 5 or 6 carbon atoms. Examples of suitable hydroxy carboxylic acids or lactones are 5-hydroxy valeric acid, 6-hydroxy caproic acid, δ-valerocatone, ε-caprolactone and the alkyl substituted ε-caprolactones such as 4-methyl, 3-methyl, 7-methyl, 5-methyl, 5-tert butyl, 4,4,6-trimethyl and 4,6,6-trimethyl ε-caprolactone. When the group $(O\text{—}B\text{—}CO)_n$ is the residue of two or more different hydroxy carboxylic acids or lactones it is preferably derived from δ-valerolactone and ε-caprolactone. It is also preferred that when $(O\text{—}B\text{—}CO)_n$ is derived from two or more different hydroxy carboxylic acids or lactones thereof that 6-hydroxy caproic acid or δ-caprolactone is the major component.

It is much preferred that n is zero except where A-X— is the residue of $(C_{1-6}$-alkyl) acrylic acid.

In one preferred class of compounds, m is from 1 to 4, especially where n is zero and in another preferred class of compounds mi is 1, n is zero and A-X is the residue of maleimide anhydride.

Commercial grades of acrylic acid generally contain some polymeric material of structure $CH_2\!=\!CH\text{—}CO(OCH_2CH_2CO)_x OH$ where x is from 2 to 4. It is to be understood that the reference to acrylic acid derivatives hereinbefore includes such polymers.

Specific examples of compounds of formula 1 are β-carboxyethylacrylate, 6-carboxyhexylmaleimide and 10-carboxydecylmaleimide.

The polymeric material may be any polymer matrix with which inorganic particulate solids are employed and include rubber, resins and plastics materials. Examples of such polymeric materials are natural rubber; synthetic rubbers such as styrene-butadiene rubber; ethylene-propylene terpolymer rubber; urethane rubber; polyolefins such as polyethylene, polypropylene and polyisobutylene; polyacrylonitrile; polybutadiene; copolymers of butadiene and acrylonitrile; polystyrene; poly(styrene acrylonitrile); copolymers of styrene with butadiene and acrylonitrile; copolymers of ethylene with propylene or but-1-ene or vinyl acetate or maleic anhydride; polycarbonate resins; phenoxy resins; polyvinyl chloride; copolymers of vinyl chloride with vinyl acetate or other vinyl esters; polyvinyl acetate; polyethyl vinyl acetate; linear polyesters; polyvinyl acetals; polyvinylidene chloride; copolymers of vinylidene chloride with vinyl chloride and acrylic acid; poly(methyl methacrylate); super polyamides such as nylon 6,6 and 6,10; polyimides; polysulphones; alkyl resins such as polymers of dialkyl phthalates; epoxy resins; phenolic resins; silicone resins; polyester resins including alkyl resins; poly(vinyl acetate-vinyl chloride); poly(vinylidene chloride); thermoplastic polyurethanes; thermoplastic polyhydroxy ethers; thermoplastic polyesters and poly (vinyl-chloride-maleic anhydride). Preferably, the polymeric material is a thermoplastic polymer such as polyethylene, polypropylene, ethylene propylene rubber or poly ethyl vinyl acetate.

The inorganic particulate solid may be any solid material which is used with polymeric materials and specifically includes such solids used as fillers. The solids may be in the form of a granular material or in the form of a powder, especially a blown powder. Examples include calcium carbonate, calcium sulphate, barium sulphate, barium carbonate, magnesium oxide, magnesium hydroxide, titanium dioxide, iron oxide, calcium and magnesium silicates, alumino silicates, kaolin, mica, talc, metal fibres and powders, zinc, aluminium, aluminium trihydroxide, glass fibres, refractory fibres, carbon black including reinforcing and non-reinforcing carbon black, alumina, quartz, wood flour, powdered paper/fibre, asbestos, crysatile, anthophylite, crocidolite, wollastonite, attapulgite and the like.

Useful effects have been obtained using aluminium trihydroxide and calcium carbonate as inorganic particulate solid and ethyl vinyl acetate or polypropylene as polymeric material.

The compounds of formula 1 where n is zero can be made by any method known to the art. Thus, where A is the residue of maleimide, the coupling modifier may be made by reacting maleic anhydride with an amino carboxylic acid in a suitable solvent. Suitable solvents are $C_{1-8}$-lower alkyl carboxylic acids and especially acetic acid. The amino carboxylic acids contain an alk(en)ylene chain containing up to 18 carbon atoms and may be branched or preferably linear. Examples are 6-amino caproic acid, 11-amino undecanoic acid and β-alanine. The reaction is typically carried out at a temperature above 50° C. and preferably above 90° C. Conveniently, the reaction is carried out at the boiling point of the lower alkyl carboxylic acid. The preparation of maleimide alkylene carboxylic acids is described in EP 847,991.

When A is the residue of (meth)acrylic acid and X is N or O and n is zero, the coupling modifier is obtainable by reacting (meth)acrylic acid with either an amino carboxylic acid or hydroxycarboxylic acid containing an alk(en)ylene chain with up to 18 carbon atoms. The reaction may optionally be carried out in the presence of an inert solvent and is typically carried out at a temperature of from 50° C. to 120° C. An example is β-carboxy ethyl acrylates.

When n is 1 to 5, the coupling modifier is obtainable by reacting a compound of formula 1 where n is zero with a hydroxy carboxylic acid or lactone thereof in an inert atmosphere and at a temperature from 50° C. to 250° C. Examples of lactones are δ-valerocatone and ε-caprolactone including mixtures thereof. The inert atmosphere may be provided by any of the inert gases of the Periodic Table but is preferably nitrogen. Preferably the reaction is carried out at a temperature above 100° C. and especially above 150° C. In order to minimise charring of the coupling modifier the temperature is preferably not greater than 200° C. and especially not greater than 180° C. It is also preferred that the reaction is carried out in the presence of an esterification catalyst such as a metal salt of an alkanol for example zirconium butylate.

Some of the coupling modifiers of formula 1 are new. Hence, as a further aspect of the invention there is provided a compound of formula 1 wherein A, X, Y, B and m are as defined hereinbefore and n is from 1 to 5.

The coupling modifier may be coated on the surface of the particulate solid at any convenient stage in the preparation of the composite. Thus, the particulate solid may be pre-coated with the coupling modifier or the coupling modifier may be added to a mixture of particulate solid and polymeric material during preparation of the composite.

When the particulate solid is pre-coated with the coupling modifier it may be prepared by mixing the two components together under anhydrous conditions. This mixing may be accompanied by an attrition process to reduce the particle size of the particulate solid. Alternatively, the coupling modifier may be applied to the particulate solid in a liquid carrier which may be a polar or non-polar organic solvent or an aqueous emulsion. Contact between the particulate solid and carrier containing the coupling modifier may involve any method known to the art such as dipping or spraying. The coated particulate solid may then be separated from the organic solvent by any suitable means such as filtration and any excess coupling modifier may be removed, where desired, by washing with an appropriate organic solvent. As a further variant the coated particulate solid may be obtained by evaporation of the organic solvent. Examples of suitable solvents are methanol, ethanol, propanol, diethylether, acetone, methyl ethyl ketone, ethyl acetate, benzene, toluene, xylene, hexane, heptane, decalin, tetralin, chloroform, methylene chloride and chloroform.

As a further aspect of the present invention there is provided a composition comprising particulate solid and a coupling modifier of formula 1.

The mixing of the particulate solid and coupling modifier is generally carried out at from 20° C. up to the decomposition temperature of the coupling modifier. It may be carried out at normal atmospheric pressure but higher or lower pressure is also possible if this aids the distribution of the coupling modifier on the surface of the particulate solid.

When the particulate solid and coupling modifier are mixed under anhydrous conditions, the surface coating of the particulate solid is preferably carried out in the presence of air or oxygen since this reduced the possibility of the coupling modifier undergoing polymerisation.

When the particulate solid is coated with the coupling modifier in a carrier it is preferable to include a polymerisation inhibitor such as hydroquinone, methyl hydroquinone, p-benzoquinone, naphthoquinone or tert-butylcatechol or hindered phenols such as 2,6-ditert butyl phenol. Hindered phenols are available under the trademark Irganox (Ciba Geigy). The amount of polymerisation inhibitor is preferably not greater than 10%, more preferably not greater than 5% and especially not greater than 0.2% based on the weight of the coupling modifier. It is also preferred that the amount of polymerisation inhibitor is not less than 0.05% and especially not less than 0.2% based on the weight of the coupling modifier.

The amount of coupling modifier coated on the surface of the particulate solid is largely dependent on the nature of the solid and its surface area. Preferred amounts of coupling modifiers are sufficient to provide for at least a mono-molecular layer of the coupling modifier on the particulate solid. Generally, the amount of coupling modifier is not greater than 20%, more preferably not greater than 6% and especially not greater than 2% based on the weight of particulate solid. It is also preferred that the amount of coupling modifier is not less than 0.01%, more preferably not less than 0.2% and especially not less than 0.3% based on the amount of particulate solid.

The particulate solid coated with coupling modifier has been found to be particularly effective when used with thermoplastic polymeric materials, for example, polyolefins such as high density polyethylene, medium and low density polyethylenes, crystalline polypropylene, crystalline ethylene-propylene block copolymers, polybutene, and poly-4-methyl pent-1-ene; polyvinyl chloride, polyvinylidene chloride, polystyrene, poly methyl(meth)acrylates; polyamides; polyacetals, linear polyesters, polyurethanes, ABS polymers including mixtures thereof and their blends with elastomers.

In the case of thermoplastic polymers it is preferred to melt-mix the polymer, particulate solid and coupling modifier in the presence of a free radical generator such as dicumyl peroxide, 2,5-dimethyl-2,5-di(tert-butyl peroxy)hexane, azobisisobutyronitrile, dibutyltinoxide and di(tert-butyl peroxy isopropyl) benzene, Where the polymeric material already contains a free-radical generator, it may not be necessary to add further amounts of the free-radical generator. It is thought that the free radical generator causes the ethylenic bond of the coupling modifier to polymerise with itself and/or the polymeric material.

Alternatively, the free-radical generator may also be already present in the polymeric material.

The amount of free radical generator may vary within wide limits but is preferably present in amounts from 1 to 100% by weight based on the amount of coupling modifier. Preferably, the amount of free radical generator is not greater than 70% and especially not greater than 50% based on the weight of coupling modifier.

When the polymeric material containing the particulate solid and coupling modifier is applied as a coating to a solid surface the polymerisation may be initiated by other suitable means such as electron beam or actinic radiation where the composite also contains an appropriate photo initiator.

The amount of particulate solid in the composite comprising the plastics material, particulate solid and coupling modifier can vary over a wide range and depends on the nature of the particulate solid and the intended use of the composite. Typically the amount of particulate solid is from 20 to 80% and especially from 20 to 60% based on the amount of the composite.

Whereas it is generally preferred to coat the particulate solid with the coupling modifier, it is sometimes more convenient to pre-prepare a mixture of coupling modifier and polymeric material and use such a mixture to coat the particulate solid. This is particularly the case where the amount of coupling modifier is a relatively small component of the final composite.

Thus, as a further aspect of the invention, there is provided a composition comprising a coupling modifier and a polymeric material. Preferably, the amount of coupling modifier is from 1 to 30% by weight based on the amount of polymeric material. The mixing may be carried out in any suitable apparatus which is appropriate to the physical state of the coupling modifier and polymeric material. The blended mixture of coupling material and polymeric material may contain a polymerisation inhibitor or a polymerisation catalyst depending on whether it is preferred to add the blended mixture to the particulate solid either before or after polymerisation of the coupling modifier.

The composition comprising the coupling modifier and the polymeric material may be formulated with the particulate solid in a similar manner to that described hereinbefore for the coupling modifier and the particulate solid. This composition may then be treated as a "master batch" and added to additional polymeric material when forming fabricated articles. The amount of "master batch" which is mixed with the additional polymeric material may vary over wide limits depending on the nature of polymeric material and the particulate solid but is preferably from 0.5 to 50% based on the total weight of the final composite. Preferably, the amount of "master batch" is not less than 10% and especially not less than 20% based on the total weight of the composite. Although the polymeric material used in preparing the "master batch" may differ from the addition of polymeric material it is preferably the same. The use of "master batches" is especially useful where the polymeric material is polypropylene, polyethylene, polyethylene/polypropylene diene, ethyl vinyl acetate, polychloroprene, chlorinated polyethylene, chlorosulphonated polyethylene, poly vinyl chloride and especially natural and synthetic rubber such as butadiene-based elastomers like butadiene-styrene, butadiene-acrylonitrile rubbers, polybutadiene, polyisoprene or natural rubber.

The composite may contain other adjuncts which are commonly added to composites such as stabilisers, UV absorbers, plasticisiers, lubricants, cross-linking agents, cross-linking accelerators, pigments, fire retardants, anti-statics, thickening agents, blowing agents and mould release agents.

When the coupling modifier is a liquid, it is advantageous to absorb the modifier onto a porous solid since this helps uniformly distribute the coupling modifier in the plastics material, master batch or as a coating layer for the filler. Examples of porous solids are blown powders such as calcium and aluminium silicates, diatomaceous earth and bentonite clay. The coupling modifier may be mixed with the porous solid itself or it may be added to the porous solid in an organic liquid, water or in the form of an emulsion. The amount of coupling modifier is preferably from 20 to 80% based on the weight of the porous solid. The porous solid containing the coupling modifier may be added to the plastics material or filler in the same manner as the coupling modifier. The composition comprising coupling modifier and porous solid may also contain other adjuncts which are commonly included in the final composite.

The invention is illustrated by the following examples wherein all references are to parts by weight unless expressed to the contrary.

PREPARATION OF COUPLING MODIFIERS

Modifier 1—5-carboxy Pentyl Maleimide

This was prepared according to Example 4 of EP 847,991.

Maleic anhydride (80.4 parts, 820 mM ex Aldrich) and 6-amino caproic acid (60 parts, 657 mM ex Aldrich) were slurried in glacial acetic acid (400 ml) at 20° C. The reactants were then stirred under reflux (130° C.) for 5 hours giving a clear orange solution. This solution was reduced in volume by evaporating some of the acetic acid. After cooling to 20° C., the product was separated as an orange solid which was recrystallised from water (600 ml) to give a yellow solid (33.6 parts, mp=71-72° C.).

2-Carboxy ethyl maleimide and 10-carboxy decyl maleimide were prepared in similar manner.

Examples 2 to 5

Aluminium trihydrate (39 parts Alcan SF7E ex Alcan) was thoroughly mixed with a coupling modifier as listed in Table 1 below to give approximately 0.115 molar equivalents/gm. The coated filler was then compounded with ethyl vinylacetate resin (26 parts, 1020 VN5 ex Elf Atochem) in a Brabender Plasti-Corder mixer by first heating the mixing chamber to 180° C. before adding the resin. After the resin had melted the coated filler was added and thoroughly mixed for 10 min at 180° C. The composite was then cooled and allowed to stand for 24 hours before hot pressing for 10 minutes at 160° C. to give a flat sheet approximately 2 mm thickness.

The sheet was cooled to 20° C. and, after standing for 24 hours, dumbbell-shaped patterns were cut having a waist of about 4 mm. The tensile strength and elongation of these patterns were measured using a Hounsfield H10 Tensometer equipped with 1000N load cell and H500L laser extensometer. The average tensile strength and elongation of 6 repeat samples is given in Table 1.

TABLE 1

| Example | Coupling Modifier | Modifier to filler Mequ/gm | Tensile Strength | % Elongation |
|---------|-------------------|----------------------------|------------------|--------------|
| 1 | CEM | 0.115 | 11.46 | 137.8 |
| 2 | CPM | 0.114 | 12.28 | 130.6 |
| 3 | CDM | 0.113 | 12.51 | 181.2 |
| 4 | BCA | 0.115 | 13.72 | 161.7 |
| 5 | BCA* | 0.115 | 15.44 | 159.1 |

Footnote to Table 1
CEM is 2-carboxyethylmaleimide.
CPM is 5-carboxypentylmaleimide.
CDM is 10-carboxydecylmaleimide.
BCA is 2-carboxyethylacrylate ex Bimax.
*Example 5 is a repeat of Example 4 except that the composite contained 0.06% by weight cumyl peroxide based on weight of filler which was added at the compounding stage.

The invention claimed is:

1. A composition comprising a plastics material, an inorganic particulate solid and a coupling modifier of formula 1

$$A\text{-}(X\text{—}Y\text{—}CO)_m(O\text{—}B\text{—}CO)_n OH \quad 1$$

wherein
A is a moiety containing a terminating ethylenic bond with one or two adjacent carbonyl groups;
X is O and m is 1 to 4 or X is N and m is 1;
Y is $C_{1-18}$-alkylene or $C_{2-18}$-alkenylene;
B is $C_{2-6}$-alkylene;
n is 0 to 5;
provided that when A contains two carbonyl groups adjacent to the ethylenic group, X is N.

2. A composition as claimed in claim 1 wherein A-X— is the residue of acrylic acid.

3. A composition as claimed in claim 2 wherein (O—B—CO)$_n$ is the residue δ-valerolactone or ε-caprolactone or a mixture thereof.

4. A composition as claimed in claim 2 wherein n is zero.

5. A composition as claimed in claim 1 wherein A-X— is the residue of maleimide.

6. A composition as claimed in claim 5 wherein (O—B—CO)$_n$ is the residue of δ-valerolactone or ε-caprolactone or a mixture thereof.

7. A composition as claimed in claim 5 wherein n is zero.

8. A composition as claimed in claim 1 wherein (O—B—CO)$_n$ is the residue of δ-valerolactone or ε-caprolactone or a mixture thereof.

9. A composition as claimed in claim 8 wherein n is zero.

10. A composition as claimed in claim 1 wherein n is zero.

11. A composition as claimed in claim 1 wherein the inorganic particulate solid is aluminium trihydrate.

12. A composition as claimed in claim 1 wherein the plastics material is a thermoplastic polymer.

13. A composition as claimed in claim 1 wherein the amount of coupling modifier is not less than 0.01% and not greater than 10% based on the weight of particulate solid.

14. A composition as claimed in claim 1 which further comprises a polymerisation initiator.

15. A composition as claimed in claim 1 wherein the inorganic particulate solid comprises calcium carbonate and/or magnesium hydroxide.

16. A composition comprising an inorganic particulate solid and a coupling modifier of formula 1

$$A\text{-}(X\text{—}Y\text{—}CO)_m(O\text{—}B\text{—}CO)_n OH \quad 1$$

wherein
A is a moiety containing a terminating ethylenic bond with one or more adjacent carbonyl groups;
X is O and m is 1 to 4 or X is N and m is 1;
Y is $C_{1-18}$-alkylene or $C_{2-18}$-alkenylene;
B is $C_{2-6}$-alkylene;
n is 0 to 5:
provided that when A contains two carbonyl groups adjacent to the ethylenic group, X is N.

17. A composition as claimed in claim 16 which further comprises a polymerisation inhibitor.

18. A composition comprising a polymeric material and a coupling modifier of formula 1:

$$A\text{-}(X\text{—}Y\text{—}CO)_m(O\text{—}B\text{—}CO)_n OH \quad 1$$

wherein
A is a moiety containing a terminating ethylenic bond with one or more adjacent carbonyl groups;
X is O and m is 1 to 4 or X is N and m is 1;
Y is $C_{1-18}$-alkylene or $C_{2-18}$-alkenylene;
B is $C_{2-6}$-alkylene;
n is 0 to 5;
provided that when A contains two carbonyl groups adjacent to the ethylenic group, X is N.

* * * * *